US012321025B2

(12) United States Patent
Zhou et al.

(10) Patent No.: US 12,321,025 B2
(45) Date of Patent: Jun. 3, 2025

(54) INTEGRATED SILICON PHOTONICS TRANSCEIVERS ENABLING ULTRA-HIGH-SPEED HIGH DENSE INPUT/OUTPUT AND INTERCONNECT FOR TERABYTE PER SECOND OPTICAL INTERCONNECT

(71) Applicant: Intel Corporation, Santa Clara, CA (US)

(72) Inventors: Jianying Zhou, Dublin, CA (US); Jin Hong, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 17/481,538

(22) Filed: Sep. 22, 2021

(65) Prior Publication Data
US 2022/0003948 A1   Jan. 6, 2022

Related U.S. Application Data

(60) Provisional application No. 63/219,764, filed on Jul. 8, 2021.

(51) Int. Cl.
*G02B 6/42* (2006.01)
*G02B 6/12* (2006.01)
(Continued)

(52) U.S. Cl.
CPC ....... *G02B 6/4279* (2013.01); *G02B 6/12004* (2013.01); *G02B 6/4215* (2013.01);
(Continued)

(58) Field of Classification Search
CPC ........ G02B 6/428; G02B 6/4214; G02B 6/43; G02B 6/4274; G02B 6/12004;
(Continued)

(56) References Cited

U.S. PATENT DOCUMENTS 10,620,266 B2    4/2020  Shanbhogue et al.
2014/0203175 A1*  7/2014  Kobrinsky ........... G02B 6/4214
                                                    250/214.1
(Continued)

OTHER PUBLICATIONS

Jessica Shea Choksey, "What is LiDAR, and How Does It Work?", J.D. Power, 2019, pp. 1-12.
(Continued)

*Primary Examiner* — Michelle R Connelly
(74) *Attorney, Agent, or Firm* — Essential Patents Group, LLP

(57) ABSTRACT

In one embodiment, an optical transceiver includes: a photonic integrated circuit (PIC) formed on a semiconductor die having a first side and a second side opposite the first side, where the first side includes a first optical circuit and a second optical circuit and the second side is to electrically couple with a substrate. The PIC may further have one or more through silicon vias (TSVs) formed through the semiconductor die to electrically couple the first side with the second side, where at least one of the TSVs is to enable electrical coupling between a first other die adapted to the first side and a second other die. Other embodiments are described and claimed.

11 Claims, 10 Drawing Sheets

(51) Int. Cl.
　　　*G02F 1/03*　　　(2006.01)
　　　*G02F 1/21*　　　(2006.01)
　　　*G02F 1/225*　　(2006.01)

(52) U.S. Cl.
　　　CPC ............ *G02F 1/0316* (2013.01); *G02F 1/212* (2021.01); *G02F 1/2255* (2013.01); *G02F 2201/127* (2013.01)

(58) Field of Classification Search
　　　CPC ...... G02B 6/4249; G02B 6/12; G02B 6/4246; G02B 6/4257; G02B 6/4245; G02B 6/4279; G02B 6/4215; H01L 25/167; H01L 23/49827; G02F 1/212; G02F 1/2255; G02F 2201/127; G02F 1/0316
　　　See application file for complete search history.

(56) References Cited

U.S. PATENT DOCUMENTS

| | | | |
|---|---|---|---|
| 2017/0194310 A1* | 7/2017 | Evans | H01L 24/09 |
| 2019/0158186 A1* | 5/2019 | Schmogrow | H04J 14/0226 |
| 2020/0301070 A1* | 9/2020 | Nagarajan | G02B 6/428 |
| 2021/0018598 A1 | 1/2021 | Rakuljic | |

OTHER PUBLICATIONS

Robert Blum, Silicon Photonics, The Key To Data Centre Connectivity, Optical Connections News, Issue 10, Q3 2017, 2 pgs.

\* cited by examiner

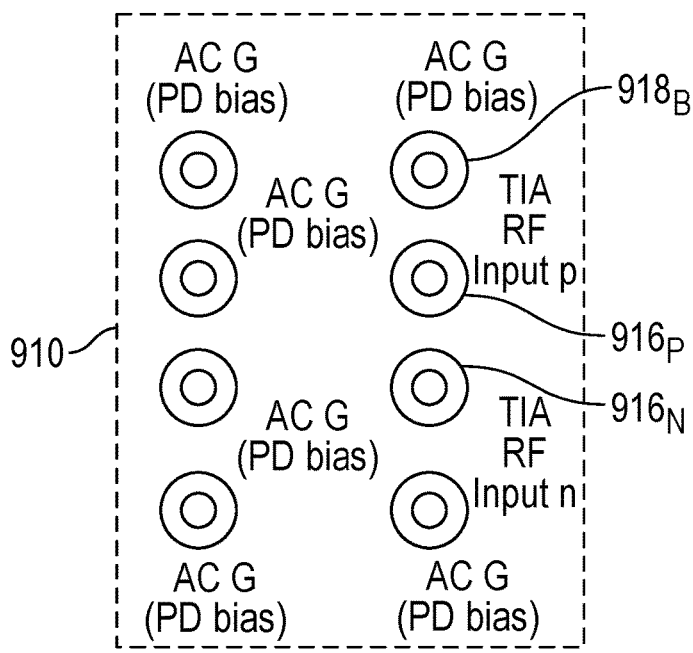
FIG. 9B
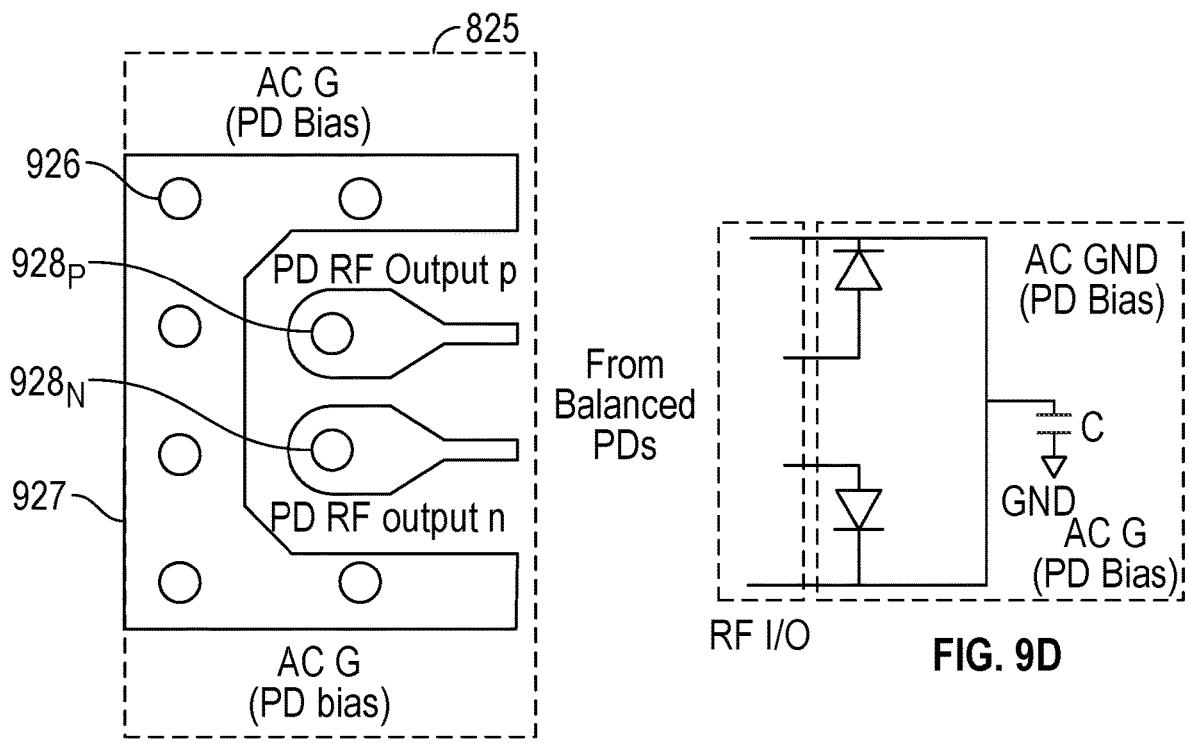
FIG. 9C
FIG. 9D

INTEGRATED SILICON PHOTONICS TRANSCEIVERS ENABLING ULTRA-HIGH-SPEED HIGH DENSE INPUT/OUTPUT AND INTERCONNECT FOR TERABYTE PER SECOND OPTICAL INTERCONNECT

CROSS-REFERENCE TO RELATED APPLICATION

This application claims priority to U.S. Provisional Patent Application No. 63/219,764, filed on Jul. 8, 2021, in the names of Jianying Zhou and Jin Hong, entitled "Integrated Silicon Photonics Transceivers Enabling Ultra-High-Speed High Dense I/O And Interconnect For TB/S Optical Interconnect," the disclosure of which is hereby incorporated by reference.

BACKGROUND

Continued growth in computing and mobile devices will continue to increase the demand for increased bandwidth density. At some point, electrical limits will be reached, and higher speed communication may occur using optical signaling. Current packaging for such optical communication systems is expensive, bulky, and places limits on speed.

BRIEF DESCRIPTION OF THE DRAWINGS

FIGS. 9A-9D illustrate an integrated balanced PD/TIA, in particular a PD/TIA subassembly, a TIA RF input bonding pad layout, a PD RF output bonding pad layout, and PD equivalent circuit, in accordance with various embodiments.

DETAILED DESCRIPTION

Figure 1:
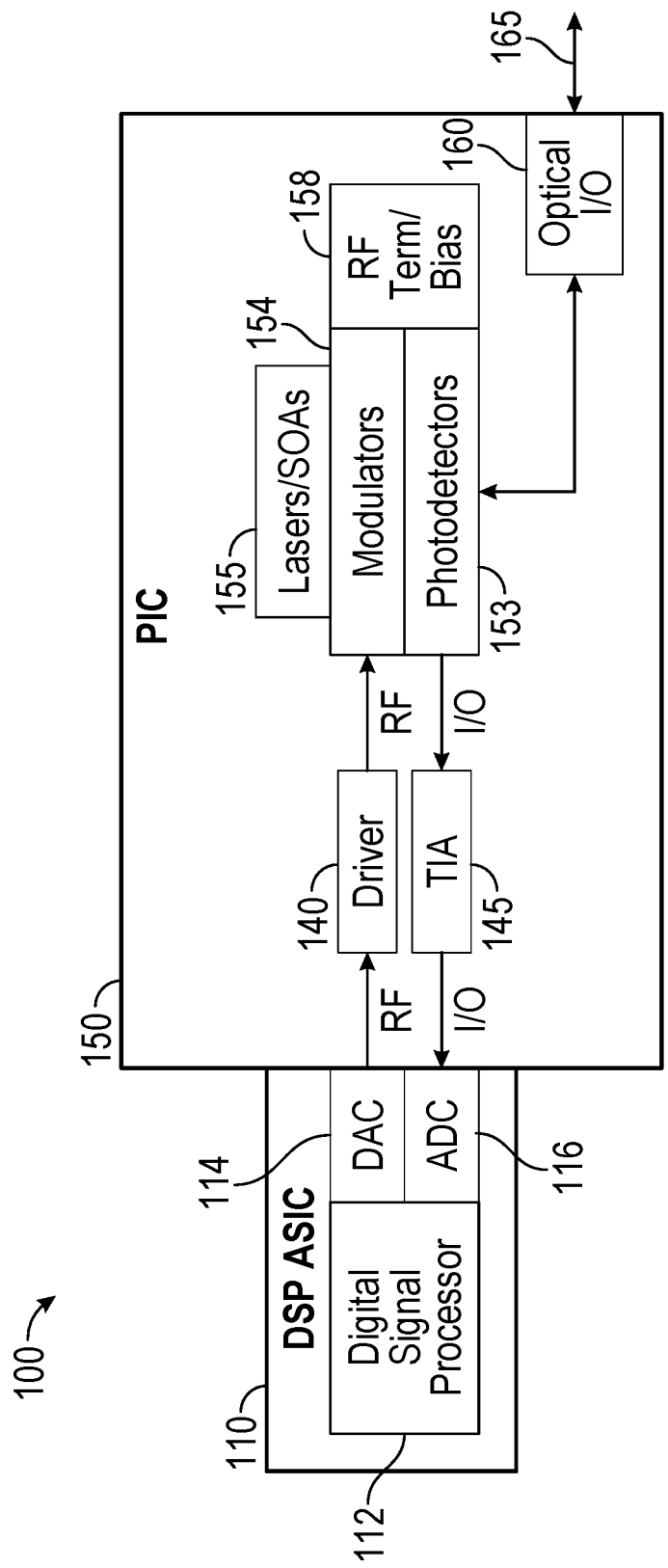
FIG. 1 is a function block diagram showing integrated ultra-high-speed transceivers for Terabyte per second (Tb/s) applications, in accordance with various embodiments.

Embodiments described herein may be related to apparatuses, processes, and techniques related to integrated transceiver architectures to support ultra-high-speed high dense I/O and interconnect, provide high-efficiency thermal dissipation, and on-chip termination and bias networks to enable ultra-high-speed and high channel counts for Tb/s optical interconnects. For example, the Tb/s optical interconnects may operate at 1.6-3.2 Tb/s with 8-16 optical channels based on 100 gigabaud (Gbaud) 4-level pulse amplitude modulation (PAM4), and/or to support 0.8-1.6 Tb/s or above single or dual optical carriers based on dual polarization 120 Gbaud 16 quadrature amplitude modulation (QAM).

Embodiments described herein may include RF I/O and interconnect structures with flip chip bonding (FCB) and TSV for integrated transceivers to enable ultra-high-speed I/O and interconnect, as well as high efficient thermal dissipation for high power lasers, high-power modulator drivers, digital signal processors (DSP), application specific integrated circuits (ASIC), and the like.

Embodiments described herein may include RF interconnect and transient design via direct bonding between a driver modulator and between PD and TIA, thus enabling optimizing the transient design. For example, TW-MZM with signal-to-signal (SS) under doping for ultra-high-speed modulation signals for ultra-high-speed performances and low cross talk for high channel count.

Embodiments may include on-chip termination and/or bias network for ultra-high-speed performance and to eliminate space limitations on RF termination and direct current (DC) routing. In embodiments, this may include an impedance termination network for RF signals such as impedance match for TW-MZM, and/or bias network for PN (p and n) bias and power supply (PS) for open drain driver for high-speed modulator, such as TW MZM.

In implementation of various embodiments, an RF interconnect and transition may exist between a driver and a modulator on a stack package, and RF termination and bias on modulators, as well as direct bonding between the PD and TIA.

Legacy implementations use a low baud rate (for example 59-69 Gbaud) to support 400-800 Gb/s with 4-8 channels, and/or 400-600 Gb/s QAM with a single carrier. These legacy implementations cannot support ultra-high-speed modulation and detection with high channel counts for Tb/s applications due to legacy implementation limitations from the RF I/O and interconnect, thermal efficiency, and termination, as well as DC bias for integrated modulators and drivers and integrated PD and TIA, which use wire bonding (WB) for RF I/O and interconnects, and/or non-integrated RF termination and bias.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

Legacy transceivers are based on a silicon PIC and have applications limited to 50-60 Gbaud with RF interconnect, and use a legacy transceiver subassembly with wire bonding (WB) for radiofrequency (RF) input output (I/O) and interconnect. This legacy transceiver has a limitation for ultra-high-speed RF I/O and interconnect because it uses wire bonding between the driver and modulator, wire bonding between the photodetector (PD) and TIA, wire bonding between the DSP ASIC and the driver, and/or wire bonding between the TIA and DSP ASIC.

Other legacy transceiver subassemblies have flip chip bonding (FCB) and through silicon vias (TSV) within an interposer for RF I/O and interconnect. In recent legacy implementations, flip chip bonding (FCB) has been used to remove wire bonding for high speed interconnect. TSV has been part of standard fabrication process for silicon interposers and CMOS integrated circuits for 2.5D/3D integration package to reduce size and increase density. Although the interposer eliminates the WB and improves RF I/O and interconnect, the interconnect between driver and MZM and between PD and TIA are through interposer with parasitic effects which impairs ultra-high-speed signal modulation and detection. Furthermore, the thermal dissipation through back of PIC is inefficient for integrated lasers.

Another legacy transceiver subassembly with FCB and TSV within an electrical IC for RF I/O and interconnect has inefficient thermal dissipation through a PIC. Although this allows direct bonding between the driver and MZM and between the PD and TIA for ultra-high-speed modulation and detection, the resulting thermal dissipation through PIC is inefficient for high power integrated lasers and drivers. During operation, this may induce thermal and stress on components within the PIC.

Next generation data centers require integrated transceivers to support ultra-high-speed high dense RF channels to increase the baud rate and channel count for Tb/s optical interconnect applications such as intra- and inter-data center connections and chip-to-chip data communications. Furthermore, Tb/s integrated transceivers will benefit from an efficient thermal dissipation for high power integrated lasers and semiconductor optical amplifiers (SOAs) in PIC and high power modulator drivers to support higher baud rate and channel count. Subassembly without a thermoelectric cooler (TEC) for low cost and low power dissipation such as chip-on board are commonly used as conventional subassembly in pluggable modules or co-package optics. However, in legacy implementations, the issues of ultra-high-speed and thermal dissipation have not been addressed for Tb/s transceivers with high baud rate and high channel count in the conventional subassemblies with details as described below.

Embodiments described herein may be directed to methods and apparatus to address the issues in ultra-high-speed high dense I/O and interconnect, in efficient thermal dissipation and ultra-high-speed integrated driver and MZM and integrated photodetector (PD) and TIA for Tb/s transceivers with higher baud rate and channel count based on silicon photonic integration by FCB and TSV. Embodiments may include the following.

Ultra-high-speed I/O and interconnect by using FCB and TSV between DAC in DSP ASIC and driver input and between TIA output to ADC in DSP ASIC are achieved for high baud rate transceivers through the elimination of wire bonding.

Efficient thermal dissipation through short thermal path for high power integrated lasers, SOAs and modulator drivers.

FCB bonding and TSV enabling 2.5D/3D integration to reduce the transceiver size and reduce complexity by eliminating metal routing to pads at edge of chips for WB.

Ultra-high-speed transient design through FCB between driver RF output to RF input of MZM and between PD RF output to RF input of TIA On-chip RF termination and bias network to achieve ultra-high-speed design for integrated driver and MZM and integrated PD and TIA Face-up components in PIC for ease access to optical components and waveguide and thus ease for on-wafer optical and electrical test and the subsequent optical alignment assembly process and the heat dissipation management through the top of PIC.

Scalable to high dense I/O and high RF channel count for Tb/s optical transceivers.

Embodiments are directed to integrated Tb/s optical transceivers with FCB and TSV within a PIC for ultra-high-speed I/O and interconnect between DAC in DSP ASIC and driver input and between TIA output to ADC in DSP ASIC to eliminate bandwidth limitations due to WB.

In embodiments of these subassemblies, driver and TIA chips can be bonded by using FCB to PIC and TSV on PIC to create a connection to the ASIC in both RF and DC signals. In embodiments, the microprocessor IC can be integrated in DSP ASIC or a separate IC bonding on PIC. Table 1 shows self-inductance estimates for WB and TSV.

TABLE 1

Self-inductance and impedance at 50 GHz estimates

| WB Inductance | | | TSV Inductance | | |
| --- | --- | --- | --- | --- | --- |
| Parameter | Value | Unit | Parameter | Value | Unit |
| WB length | 500 | Um | TSV height | 100 | um |
| WB diameter | 25 | Um | TSV diameter | 20 | um |
| Self Inductance | 363 | pF | Self Inductance | 46 | pF |
| Impedance at 50 G | 114 | Ohm | Impedance at 50 G | 14 | ohm |

For example, a typical WB with 500 um length 1 mil diameter gold wire generates 363 pF self-inductance and induces 114 ohm impedance at 50 GHz, the Nyquist frequency of 100 Gbaud signals. Thus, it is difficult to achieve ultra-high-speed I/O and interconnect by conventional WB techniques. However, a typical copper filled TSV with 100 um height and 20 um diameter will generate 46 pF self-inductance and induces 14 ohm impedance at 50 GHz Nyquist frequency, ~⅛ times lower than one with WB, which is suitable to support 100 Gbaud and above applications.

In embodiments, integrated transceivers may support Tb/s data transmission, for example 1.6-3.2 Tb/s with 8-16 optical channels based on high baud rate PAM such as 100 Gbaud PAM4, and/or 0.8-1.6 Tb/s single or dual optical carriers based on polarization multiplexed high baud rate high QAM such as 120 Gbaud 16QAM. For ultra-high-speed high channel count, high power lasers and SOAs may be integrated in PIC to compensate the optical loss. High power drivers with high swing voltage may compensate the low modulation efficiency of modulators at higher baud rate. In embodiments, the subassembly enables efficient thermal dissipation for high power integrated lasers, SOAs and drivers.

With advanced technologies, power dissipation drivers & TIAs and lasers & SOAs may reach ~20 W for 3.2 Tb/s transceivers with 16 optical channels and 200 Gb/s per channel.

In embodiments, the efficiency thermal dissipation in the subassembly may be achieved through top of the subassembly with short thermal path to a heat sink. In embodiments, the heatsink may be discrete for each high-power component such as a laser, a SOA and a driver, or integrated for lasers and SOAs. In embodiments, there may be a single heat sink for all high power components, or an additional heatsink attached directly to the subassembly before contact with the heatsink of the transceiver.

TSV can be used in two metal layers RF interconnect, or multiple metal layers for DC route and low resistance connect for power supply or for laser bias which may require high current. PIC and DSP ASIC can be bonded using FCB on a substrate, which can be ceramic, organic, interposer or board. The stiffener can be added on the back or top, or both sides of the substrate to avoid warpage of PIC, which may impact active and passive components on PIC. In embodiments, the subassembly with FCB and TSV may allow 2.5D/3D integration to reduce the transceiver size and reduce the complexity of metal routing to pads at edge of chips.

FIG. 1 is a function block diagram showing integrated ultra-high-speed transceivers for Tb/s applications, in accordance with various embodiments. As shown in FIG. 1, a transceiver 100 may be implemented as a package having a combined assembly including a digital signal processor (DSP) application specific integrated circuit (ASIC) 110, a photonic IC (PIC) 150, and other circuitry, all of which may be adapted on a substrate (or on PIC 150 itself).

In the high level shown in FIG. 1, DSP ASIC 110 includes a DSP 112 which may perform processing on digital information to be communicated. In a transmit direction, DSP 112 may communicate such information digitally to a digital-to-analog converter (DAC) 114, which converts the digital information to analog form. In a receive direction, DSP 112 may receive digital information from an analog-to-digital converter (ADC) 116, which converts analog information to digital form.

Understand that DSP ASIC 110 may be implemented on one semiconductor die and PIC 150 another semiconductor die. However, embodiments are not limited in this regard, and in some cases at least some of the circuitry of these two different ICs can be combined. Furthermore, different allocations of the components shown may occur in other implementations.

In any event, in a transmit direction, DSP ASIC 110 sends RF signals to PIC 150, which receives them via an RF input/output (I/O) interface that couples to a driver 140. As will be further shown, driver 140 may be implemented on yet another die. In turn, driver 140, after various signal conditioning, may send the RF signals to one or more modulators 154. Modulators 154 may modulate information to be communicated using one or more light sources received via one or more lasers/semiconductor optical amplifiers (SOAs) 155. In turn, the modulated optical signals may be communicated via an optical I/O circuit 160 (which may be separate from PIC 150). Optical I/O circuit 160 may couple to an optical fiber 165, which communicates optical signals with a destination, such as another optical transceiver, e.g., located in another part of a data center.

As further illustrated in a receive direction, incoming optical data is received via optical I/O circuit 160 and provided to photodetectors 153 that in turn communicate with a transimpedance amplifier (TIA) 145 which converts the incoming RF currents to voltage signals that in turn are provided to ADC 116. TIA 145 also may be implemented on yet another die (e.g., with driver 140).

As further illustrated, in FIG. 1, PIC 150 also includes an RF termination/bias circuit 158, which provides termination circuitry for RF signals from modulators 154 as well as providing bias voltages for circuitry including modulators 154 and photodetectors 153. Understand that while shown at this high level in the embodiment of FIG. 1, many variations and alternatives are possible.

Figure 2:
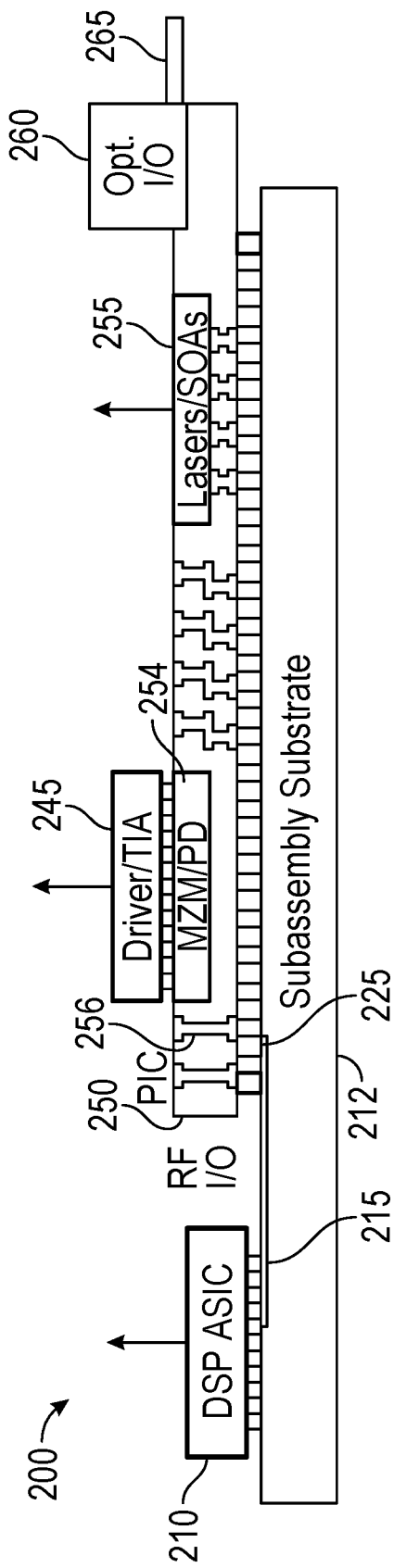
FIG. 2 illustrates a block diagram of a Tb/s integrated transceiver subassembly with flip chip bonding (FCB) and through silicon via (TSV) within a photonic integrated circuit (PIC) for radio frequency input/output (RF I/O) and interconnect with efficient thermal dissipation, in accordance with various embodiments.

FIG. 2 illustrates a block diagram of a Tb/s integrated transceiver subassembly with FCB and TSV within a PIC for RF I/O and interconnect with efficient thermal dissipation for high power integrated lasers, SOAs and drivers, in accordance with various embodiments. In FIG. 2, an integrated transceiver 200 is illustrated in a cross-sectional view. As shown in FIG. 2, transceiver 200 may be implemented with a subassembly substrate 212 on which separate ICs, namely, a DSP ASIC 210 and a PIC 250 are adapted. Continuing with the same series of numbering as in FIG. 1 (albeit of the "200" series), PIC 250 includes integrated thereon modulators and photodetectors (generically illustrated at 254) and lasers/SOAs 255. With embodiments herein, DSP ASIC 210 and PIC 250 may be adapted to substrate 212 via flip chip bonding. Of course other interconnect mechanisms are possible.

As further illustrated, PIC 250 includes through silicon vias (TSVs), with a representative TSV 256 enumerated. Further, while only a limited number of TSVs are shown, understand that many more may be present in a given embodiment. These TSVs may be used to communicate signal information between a first side and second side of PIC 250.

More specifically as shown, signaling information may be communicated via interconnects such as a radio frequency (RF) interconnect 215 of substrate 212 that in turn may couple via a given flip chip bond (e.g., 225) and through corresponding TSV 256 to thus carry signal information from DSP ASIC 210, along substrate 212, and then from one side of PIC 250 to the other. There, signals may be routed appropriately (e.g., through modulators/photodetectors 254, or so forth). As further shown in the cross section, additional flip chip bonds may couple PIC 250 to driver/TIA 245, which may be implemented as a separate integrated circuit having at least one other die. Of course in other cases, at least portions of this circuitry may be implemented within PIC 250.

In a transmit direction, incoming RF signals carrying digital data may thus traverse from DSP ASIC 210 via RF interconnect 215 through corresponding flip chip bonds and TSVs through driver 245 and modulator 254 for modulation with an optical signal from lasers/SOAs 255 and thereafter, transmission along optical fiber 265 via optical interface 260. A similar path may be provided for received signals. Note that the arrows shown in FIG. 2 identify a thermal path in which heat transfer may be released directly from the integrated circuits and the lasers/SOAs in photonic integrated circuit (PIC) to an environment.

Figure 3:
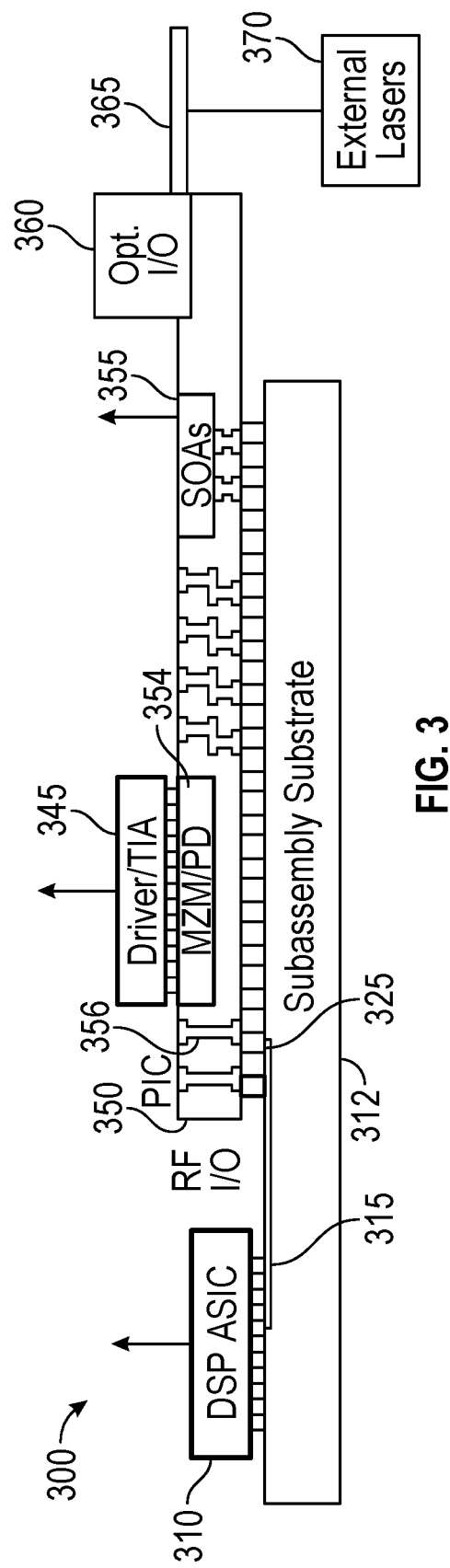
FIG. 3 illustrates a block diagram of another Tb/s integrated transceiver subassembly with FCB and TSV within a PIC for RF I/O and interconnect with efficient thermal dissipation, in accordance with various embodiments.

FIG. 3 illustrates a block diagram of another Tb/s integrated transceiver subassembly with FCB and TSV within a PIC for RF I/O and interconnect with efficient thermal dissipation for high power SOAs and drivers, where external lasers are used, in accordance with various embodiments. These embodiments may be especially suited to coherent transceivers, which require active accurate wavelength control for coherent detection. As shown in FIG. 3, transceiver 300 may be configured the same as in FIG. 2 (albeit of the "300" series), with the only distinction being that external lasers 370 are provided, rather than on-chip lasers.

Figure 4A:
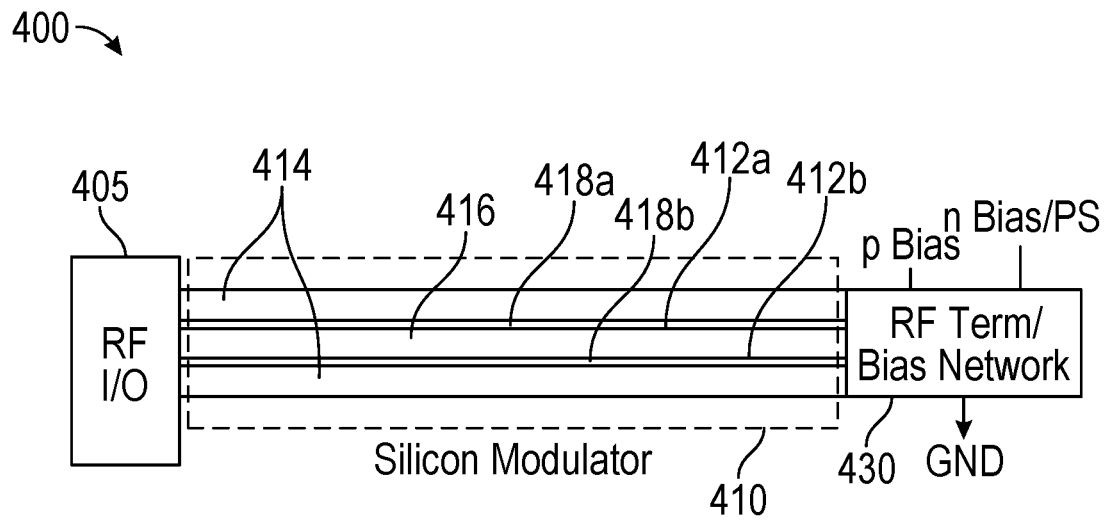
FIG. 4A illustrates a block diagram of a signal to signal (SS) RF and push-pull PN-junction structure in a traveling waveguide (TW) Mach-Zehnder modulator (MZM), in accordance with various embodiments.

Embodiments of ultra-high-speed integrated transceivers may be based on on-chip modulators and photodetectors with integrated or co-packaged drivers and TIA. The description of various embodiments on the ultra-high-speed design and termination/bias methods may use travelling waveguide Mach-Zehnder modulator (TW-MZM) as an example. As illustrated in FIG. 4A, apparatus 400, which may be a transmit portion of a transceiver, includes a modulator 410, which may be a silicon modulator having push-pull PN junctions in two doping optical waveguides, 412a and 412b, and a signal-to-signal (SS) RF differential RF SS TW structure 414. In this arrangement, a P-doping region 416 is sandwiched by an n-doping region $418_a$, $418_b$.

With modulator 410, incoming digital RF signals received from RF I/O circuit 405 may act as a modulation source. In turn, modulator 410 couples to RF termination/bias network 430, which may provide RF termination, p bias voltages, and n bias voltages to PN junctions as well as power supply to the open drain driver via the silicon modulator.

Figure 4B:
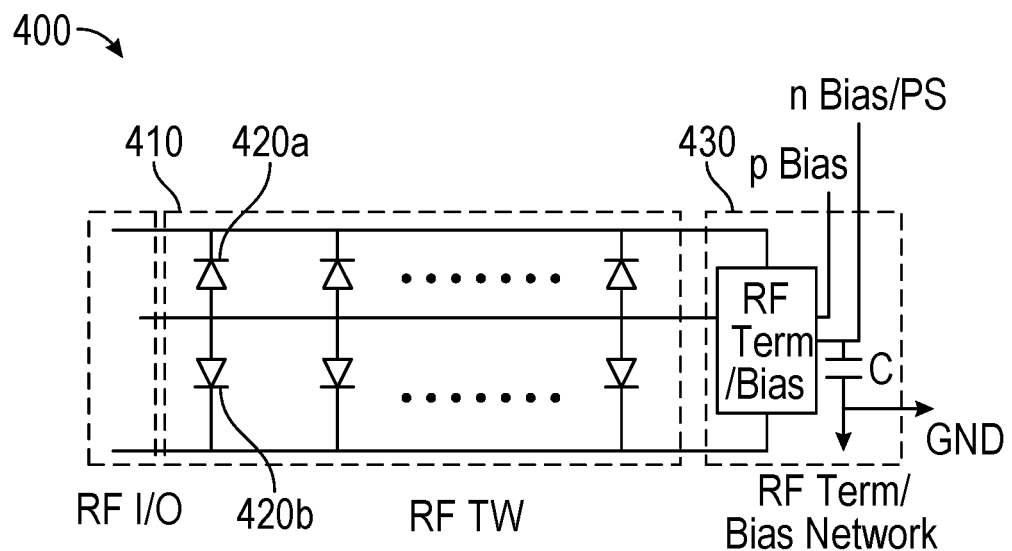
FIG. 4B illustrates a block diagram of a circuit of RF I/O, RF TW and bias and termination networks, in accordance with various embodiments.

More details are shown in FIG. 4B in which corresponding PN junctions (diodes) $420_a$, $420_b$ (as examples) are biased via bias voltage signals received from network 430, which as shown receive incoming bias signals from a control circuit (not shown for ease of illustration in FIG. 4B). As further shown, network 430 may couple to ground via a capacitor C.

FIG. 4A thus illustrates a block diagram of a RF SS TW and push-pull PN-junction structure in a TW MZM, in accordance with various embodiments, and FIG. 4B illustrates a block diagram of an equivalent circuit of RF I/O, RF TW and bias and termination networks, in accordance with various embodiments.

In embodiments, the RF I/O and interconnect with FCB of driver may achieve ultra-high-speed transient design between RF output of driver and RF input of modulator. For example, RF transition from a ground-signal-signal-ground (GSSG) configuration of driver to the RF input of TW-MZM with SS under doping configuration may occur.

In embodiments, the on-chip termination/bias network for a multiple channel ultra-high-speed modulator such as TW-MZM may include an impedance termination network for RF driver such as impedance match for TW-MZM; and/or may include a bias network for PN (p and n) bias and power supply (PS) for open drain driver for high-speed modulator such as TW MZM.

In embodiments, the RF I/O and interconnect with FCB of TIA can achieve ultra-high-speed transient design between RF output of PD and RF input of TIA. For example, RF transition from a ground-signal-ground (GSG) configuration of PD to RF input of TIA by removing parasitic impacts of legacy implementations.

RF I/O and RF interconnect for ultra-high-speed modulation signals may greatly facilitate greater than 100 Gbaud applications. Using legacy interconnect methods such as wire bonds (WB) and interposer will make it difficult to achieve RF performances at ultra-high-speed between driver and modulator such as TW MZM. These performances are sensitive to discontinuity and parasitic in RF path. Embodiments of RF I/O and interconnect with FCB provides direct bonding of the RF interconnect from between RF output of driver to RF input of modulator, such as TW MZM for high-speed modulation. The RF I/O and interconnect with FCB can be designed to optimize RF transient design from driver output to modulator input, including transience of TW from GSSG TW to SS TW and from undoped SS TW to doped SS TW for high-speed operation.

Figure 5A:
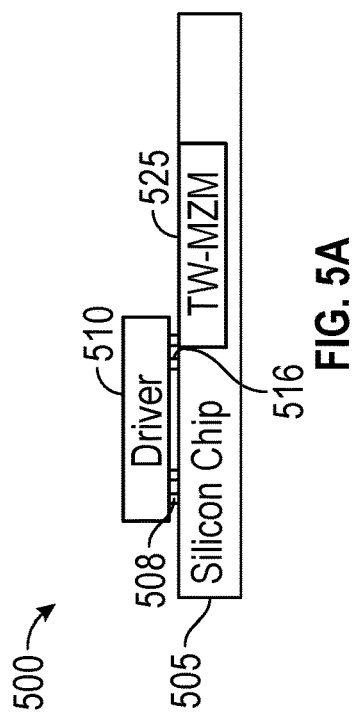
FIGS. 5A-5C illustrate diagrams of an integrated driver and modulator, showing a driver/modulator subassembly, a driver RF output bond pad layout, and a MZM RF input bond pad layout, in accordance with various embodiments.
Figure 5C:
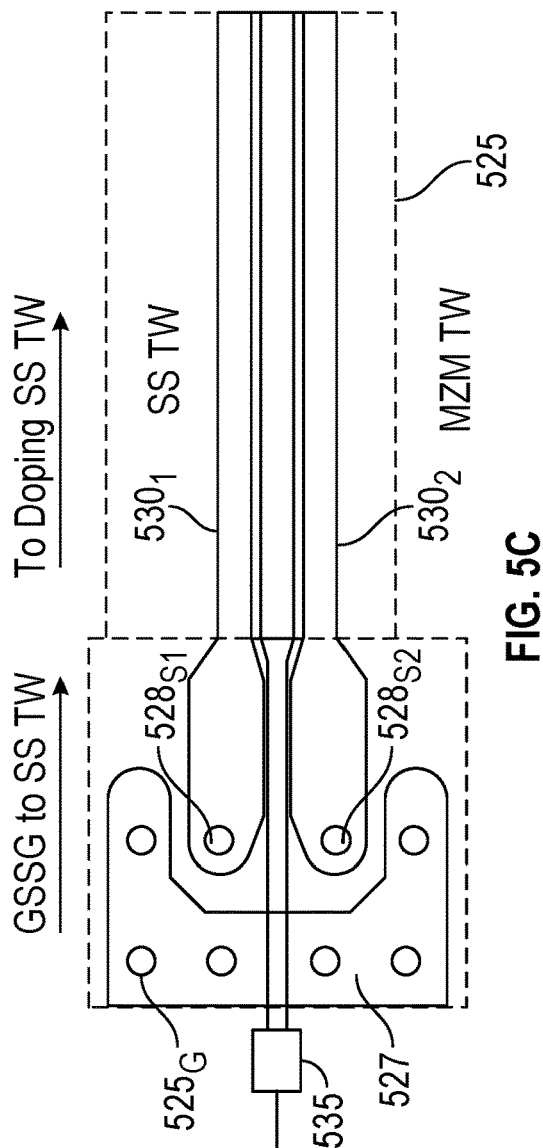
Figure 5B:
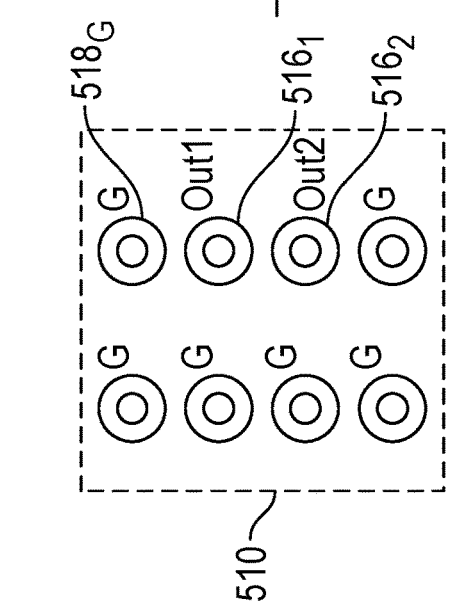

Referring now to FIG. 5A-5C, further details of an RF I/O circuit interconnect in accordance with an embodiment are shown. FIGS. 5A-5C illustrate diagrams of an integrated driver and modulator, showing a driver/modulator subassembly, a driver RF output bond pad layout, and a MZM RF input bond pad layout, in accordance with various embodiments.

As illustrated in FIG. 5A, apparatus 500 is a portion of a transceiver showing a driver and modulator portion. As shown here, a driver 510 may be implemented as one semiconductor die that may be adapted to a PIC 505 including a traveling wave modulator (namely a TW MZM) 525.

As illustrated, in a transmit direction, incoming RF signals (received from a DSP) may be communicated via an RF interconnect and proceed through flip chip bonds (e.g., bond 508) to driver 510, which conditions the signals and communicates them via additional flip chip bonds (e.g., 516) to modulator 525. FIG. 5B shows a top view of a driver RF output bond pad layout of driver 510 in which a plurality of ground pads (representative of ground pad $518_G$ is illustrated) are present, along with output signal pads (namely, signal pads $516_{1,2}$).

In turn, FIG. 5C shows a corresponding bond pad layout for these RF inputs to a modulator. As shown, modulator 525 includes ground pads $525_G$ (a representative one is enumerated) that reside in a ground region 527. In turn, differential signal bond pads $528_{s1}$, $528_{s2}$ couple to SS electrodes $530_1$, $530_2$. As further illustrated, incoming optical energy is received via an optical splitter 535, which in an embodiment may be a Mach-Zehnder Interferometer (MZI) splitter. These optical signals are then modulated with the incoming signal information.

Figure 6A:
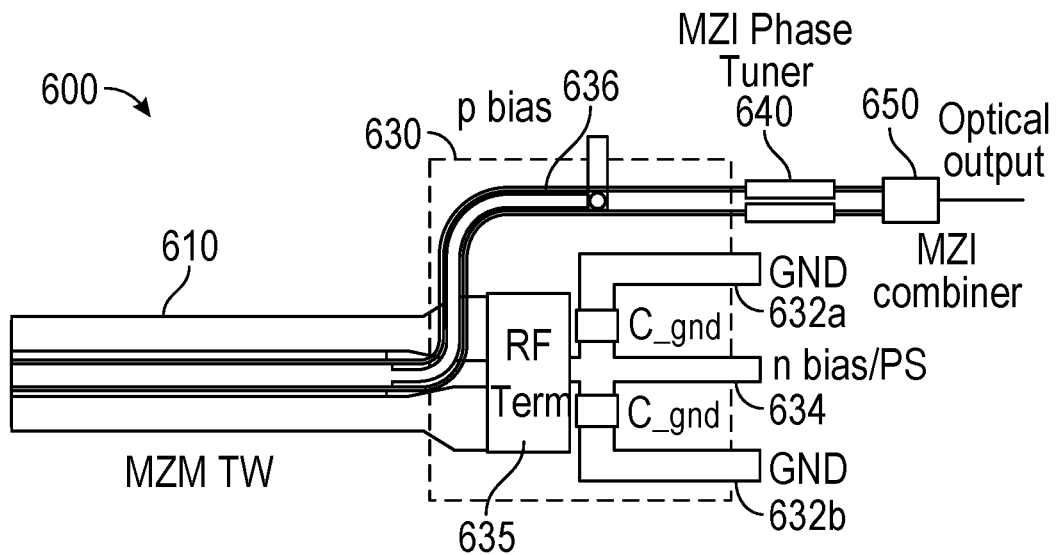
FIGS. 6A-6B illustrate diagrams of RF termination and bias network in an integrated ultra-high-speed transceiver layout and equivalent circuit for on-chip RF termination/ground (GND)/Bias network, in accordance with various embodiments.
Figure 6B:
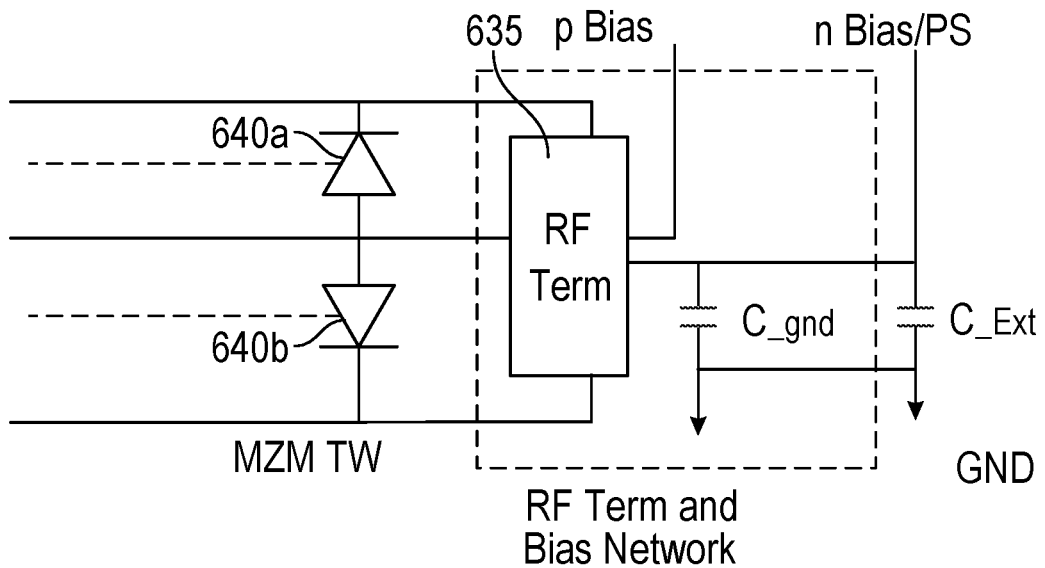

FIGS. 6A-6B illustrate diagrams of RF termination and bias network in an integrated ultra-high-speed transceiver layout and equivalent circuit for on-chip RF termination/ground (GND)/Bias network, in accordance with various embodiments.

The RF termination and bias on silicon PIC for ultra-high-speed modulation may enable ultra-high-speed performance. External resistors and capacitors are commonly used in legacy implementations for RF termination of a modulator; but suffer from back reflection because of impedance mismatch due to parasitic from interconnect between the end of TW of MZM and external resistors for high speed modulated signal termination. On-chip resistors and capacitors can facilitate integration and impedance match to eliminate the back-reflection impact for ultra-high speed modulated signal termination. In embodiments, on-chip resistors and capacitors may be used to form RF termination and bias network for an integrated transmitter In embodiments, on-chip RF termination may be used to eliminate the back-reflection impact due to impedance mismatch from parasitic for ultra-high-speed modulation. RF GND may be used to eliminate signal degradation from common signal due to modulator RF structure such as non-GND SS RF TW. In embodiments, an on-chip capacitor may be designed for RF GND at high frequency to eliminate parasitic impact, while an external capacitor can be designed to cover low frequency to overcome the capacitance limitation of on-chip capacitor for wide operating frequency range with low impedance RF GND. This may greatly facilitate high-speed modulation.

In embodiments, PN (p) bias via doping silicon trace along with WGs out of RF term region avoid the impact of routing metal on RF characterizations and then connected to routing metal to cross MZI WGs without impact on optical characteristics of the WGs.

In embodiments, RF term and bias networks can be formed at TW termination location, which allows use of on-chip RLC to optimize impedance match and provides PN bias and power supply for open drain driver.

In embodiments, on-chip resistors and capacitors may facilitate eliminating parasitic impact for high speed to support high RF channel count. The design of on-chip capacitors may enable high-count modulators in an integrated transmitter, which may have long RF GND traces for RF termination of each modulator to connect from on-chip capacitors to external capacitors. The RF GND may be used to eliminate signal degradation from common signal due to modulator RF structure such as non-GND SS RF TW. An on-chip capacitor may be designed for RF GND at high frequency to eliminate parasitic impact. In embodiments, an external capacitor can be designed to cover low frequency to overcome the capacitance limitation of on-chip capacitor for wide operating frequency range with low impedance RF GND. Example design with on-chip capacitors and external for RF termination and DC power supply for open drain driver with low GND impedance in wide operating frequency range.

FIG. 6A shows an arrangement of a network 630 at another end of a modulator. In this arrangement, an opposite end of modulator 610 couples to an RF termination circuit 635 that, in turn, couples to ground and bias/power supply electrodes, including ground electrodes $632_{a,b}$ and a n bias/power supply electrode 634.

As further illustrated, a p bias signal is fed through a bias line 636. As further shown, resulting modulated optical signals are communicated through a phase tuner 640 which in an embodiment may be an MZI phase tuner and after combining an optical combiner 650 (e.g., an MZI combiner) are output. FIG. 6B shows an equivalent circuit for this network, with capacitance provided both with an on-chip capacitance $C_{gnd}$ and an external capacitance $C_{ext}$. For example, 100 picoFarad (Pf) $C_{gnd}$ can provide <1.6 ohm termination to ground for >1 GHz RF signal frequency, while a 100 nanoFarad (nF) $C_{ext}$ can provide <1.6 ohm termination to ground for >1 MHz RF signal.

Figure 7:
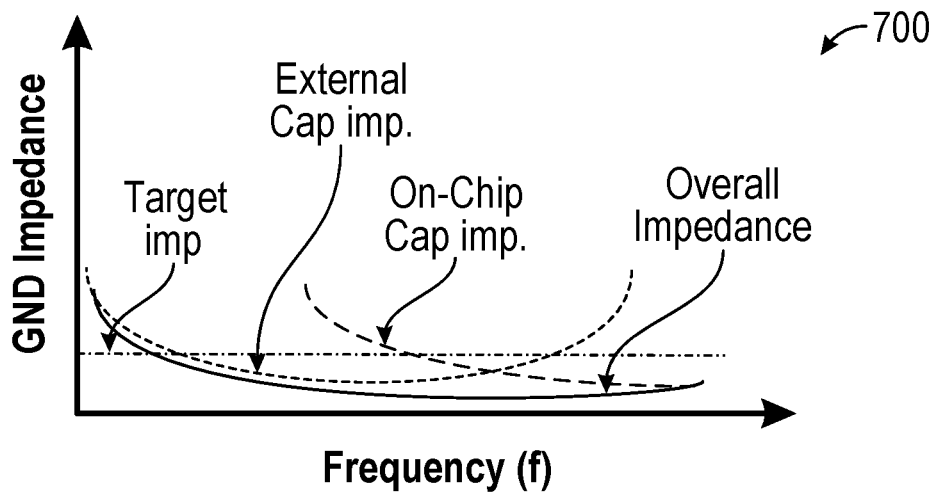
FIG. 7 illustrates a chart of GND impedance of p bias and power supply for an open drain driver achieved by on-chip cap and external caps, in accordance with various embodiments.

FIG. 7 illustrates a chart of GND impedance of p bias and power supply for an open drain driver achieved by on-chip capacitor and external capacitors, in accordance with various embodiments.

In embodiments, the design may be applied to other high-speed silicon photonics modulators such as electro-absorption modulators (EAM) or micro-ring modulators (MRM).

In embodiments, the design may also be applied in integrated PD and TIA design with single PD for direct detection receiver with 100 Gbaud or above PAM modulation and balance detectors for coherent receiver with 120 Gbaud or above QAM modulation.

FIGS. 8A-8D illustrate an integrated single photodetector (PD)/transimpedance amplifier (TIA), in particular a PD/TIA subassembly, a TIA RF input bonding pad layout, a PD RF output bonding pad layout, and PD equivalent circuit, in accordance with various embodiments.

Figure 8A:
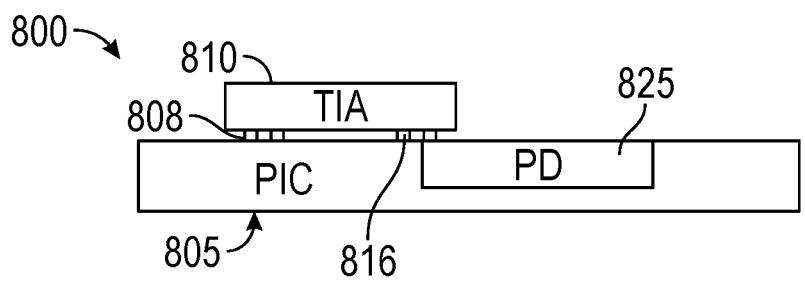
FIGS. 8A-8D illustrate an integrated single photodetector (PD)/transimpedance amplifier (TIA), in particular a PD/TIA subassembly, a TIA RF input bonding pad layout, a PD RF output bonding pad layout, and PD equivalent circuit, in accordance with various embodiments.

As illustrated in FIG. 8A, apparatus 800 is a portion of a transceiver showing a PD and TIA portion. As shown here, a TIA 810 may be implemented as one semiconductor die that may be adapted to a PIC 805 including a photodetector (namely a PD) 825.

As illustrated, in a receive direction, PD 825 may generate electrical signals (e.g., currents) from incoming optical signals, which may be communicated via flip chip bonds (e.g., 816) to TIA 810, which converts these signals to voltages which in turn are communicated via flip chip bonds (e.g., 816), and an RF interconnects via flip chip bonds (e.g., 808) that in turn may be directed to a DSP (not shown in FIG. 8A).

Figure 8B:
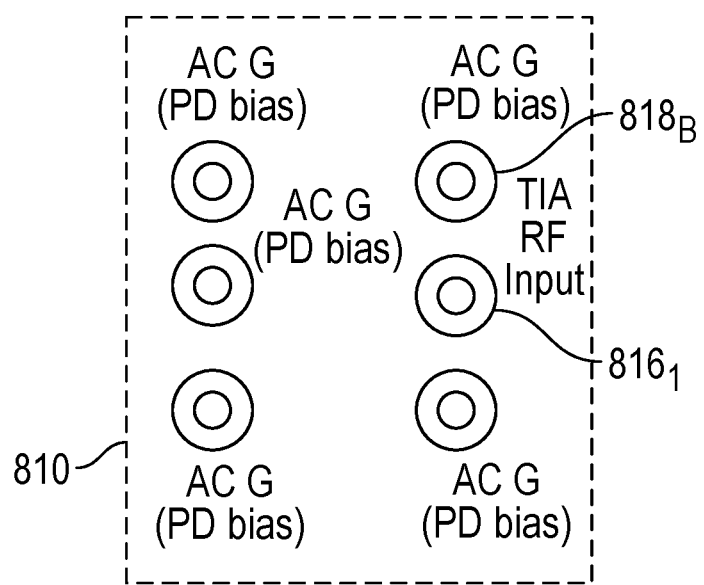

FIG. 8B shows a top view of a bond pad layout of TIA 810 in which a plurality of photodetector bias pads are presented (representative pad 8188 is illustrated), along with an input signal pad (namely, signal pad 8161).

Figure 8D:
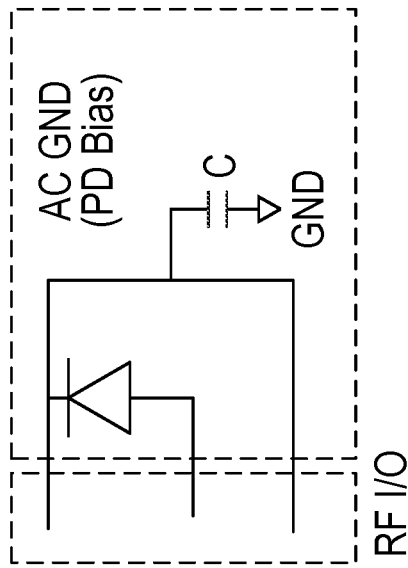
Figure 8C:
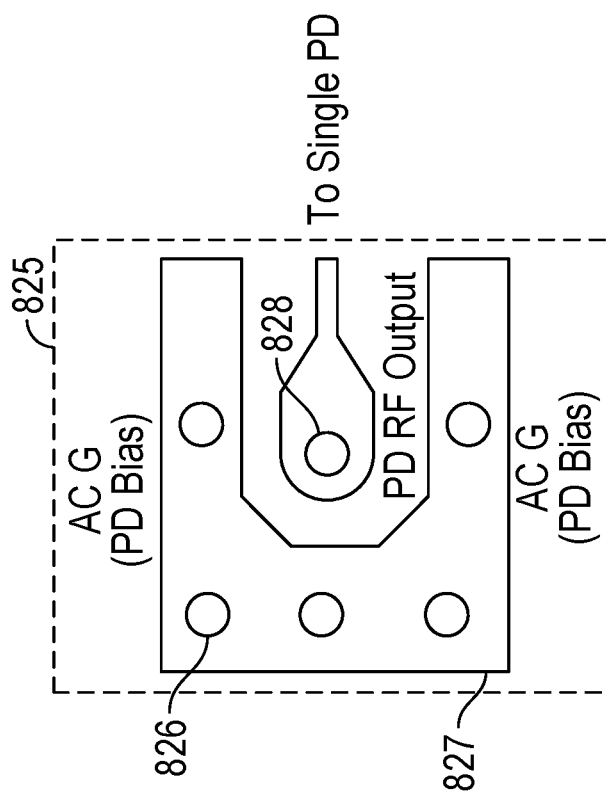
Figure 9A:
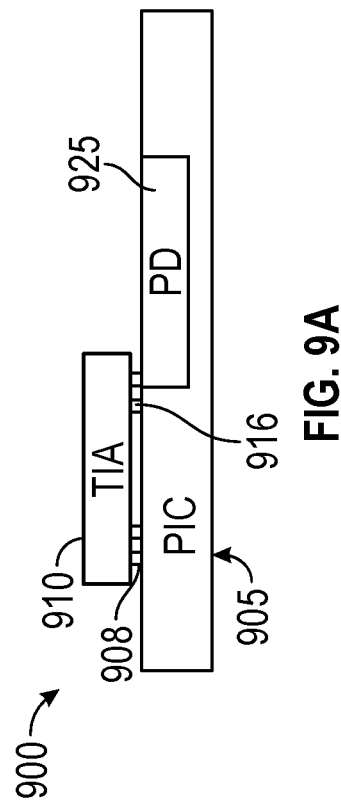

In turn, FIG. 8C shows a corresponding bond pad layout for a photodetector. As shown, photodetector 825 includes AC ground pads 826, which also provide DC bias to photodetector, that reside in an AC ground region 827. In turn, a waveguide PD RF output couples to a signal bond pad 828. FIG. 8D illustrates an equivalent circuit.

Figure 10:
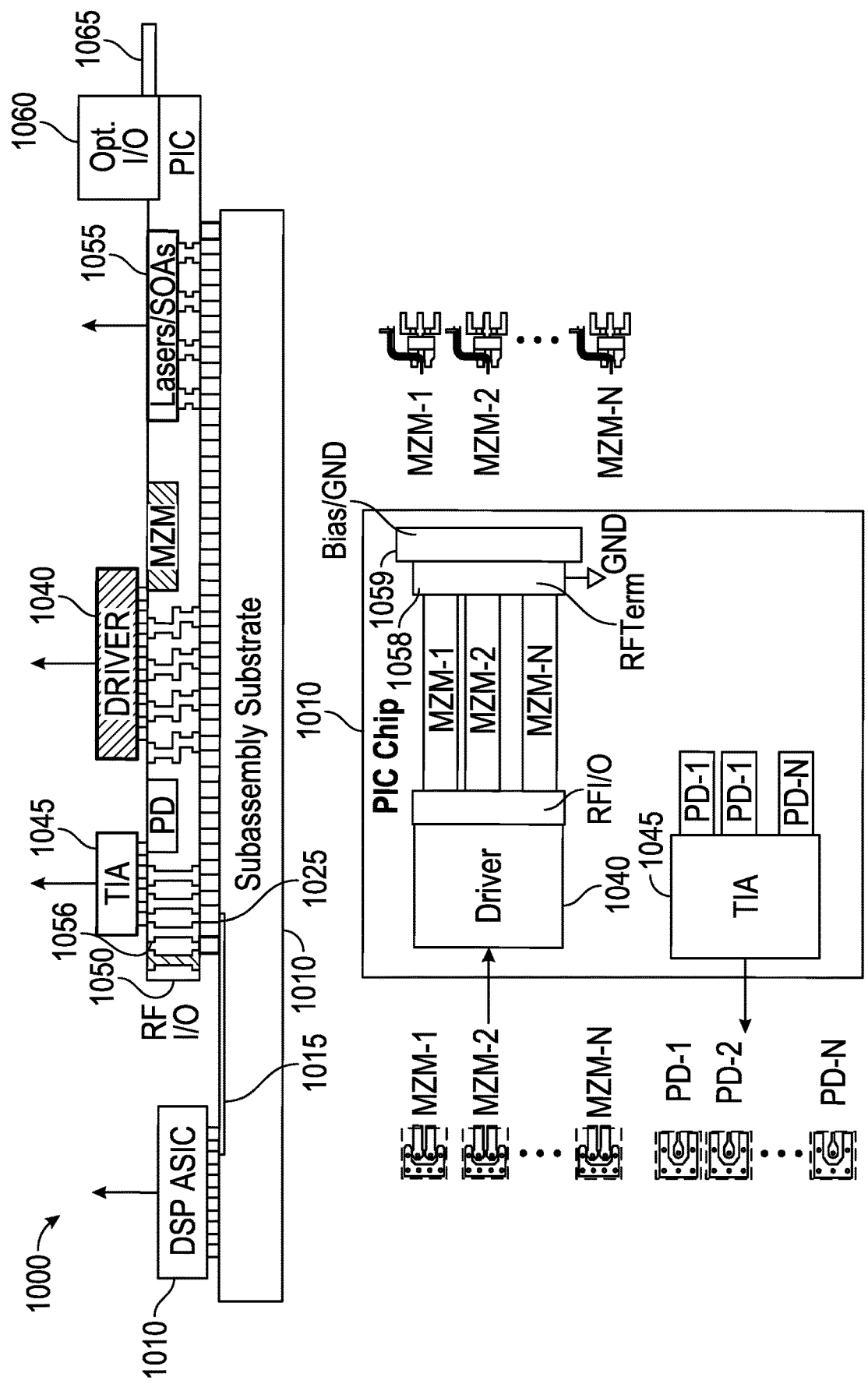
FIG. 10 illustrates a multiple transceiver subassembly and layout with ultra-high-speed high dense I/O and interconnect and on-chip terminal and bias network, in accordance with various embodiments.

FIGS. 9A-9D illustrate an integrated balanced PD/TIA, in particular a PD/TIA subassembly, a TIA RF input bonding pad layout, a PD RF output bonding pad layout, and PD equivalent circuit, in accordance with various embodiments. In embodiments, these PD/TIA subassembly designs may enable ultra-high-speed I/O and interconnect between PD and TIA and the transition from RF output of PD to RF input of TIA, as well as on-chip capacitor for PD bias noise filtering, similar to the design in FIG. 6. Note that this arrangement, the same series of numbering as in FIGS. 8A-8D are used (albeit of the "900" series), FIG. 10 may be directed to scaling for multiple channel transceivers with ultra-high-speed high dense I/O and interconnect and on-chip terminal and bias network. More specifically, FIG. 10 illustrates a multiple transceiver subassembly and layout, in accordance with various embodiments. In embodiments, the RF I/O and interconnect with FCB and TSV in PIC can be scalable to support integrated transceivers with high channel count for ultra-high-speed modulation and detection to eliminate cross talk due to WB and also save the space for RF routing and transition.

In FIG. 10, the same components follow the same numbering conventions of the above Figures, albeit of the "1000" series. As shown, multiple modulators (MZM-1 to MZM-N) and multiple photodetectors (PD-1 to PD-N) are present, each of a given channel, and which could to a driver 1040 and TIA 1045, respectively. As further shown the modulators couple between an RF I/O circuit coupled to driver 1040 and a RF termination circuit 1058 and a bias/ground network 1059.

In embodiments, the transceiver subassembly can provide efficient thermal dissipation to support high power integrated lasers and modulator drivers to support high channel count. In embodiments, ultra-high-speed I/O and interconnect by using FCB and TSV between DAC in DSP ASIC and driver input and between TIA output to ADC in DSP ASIC can be scalable to high density I/O and high RF channel count.

In embodiments, the transceiver subassembly can enable ultra-high-speed transience design for integrated driver and MZM and integrated PD and TIA through FCB between driver RF output to RF input of MZM and between PD RF output to RF input of TIA, which can be scalable for high channel count. In embodiments the on-chip termination/bias network can also be scalable for the integrated transmitter with high channel count for RF signal terminations, GND and bias. With respect to FIG. 10, embodiments of the integrated transceiver can enable higher baud rate and higher channel count for Tb/s optical interconnect, e.g., 1.6-3.2 Tb/s with 8-16 optical channels based on 100 Gbaud PAM4, and to support 0.8-1.2 Tb/s or above single or dual optical carriers based on 120 Gbaud 16 QAM dual polarization.

Figure 11:
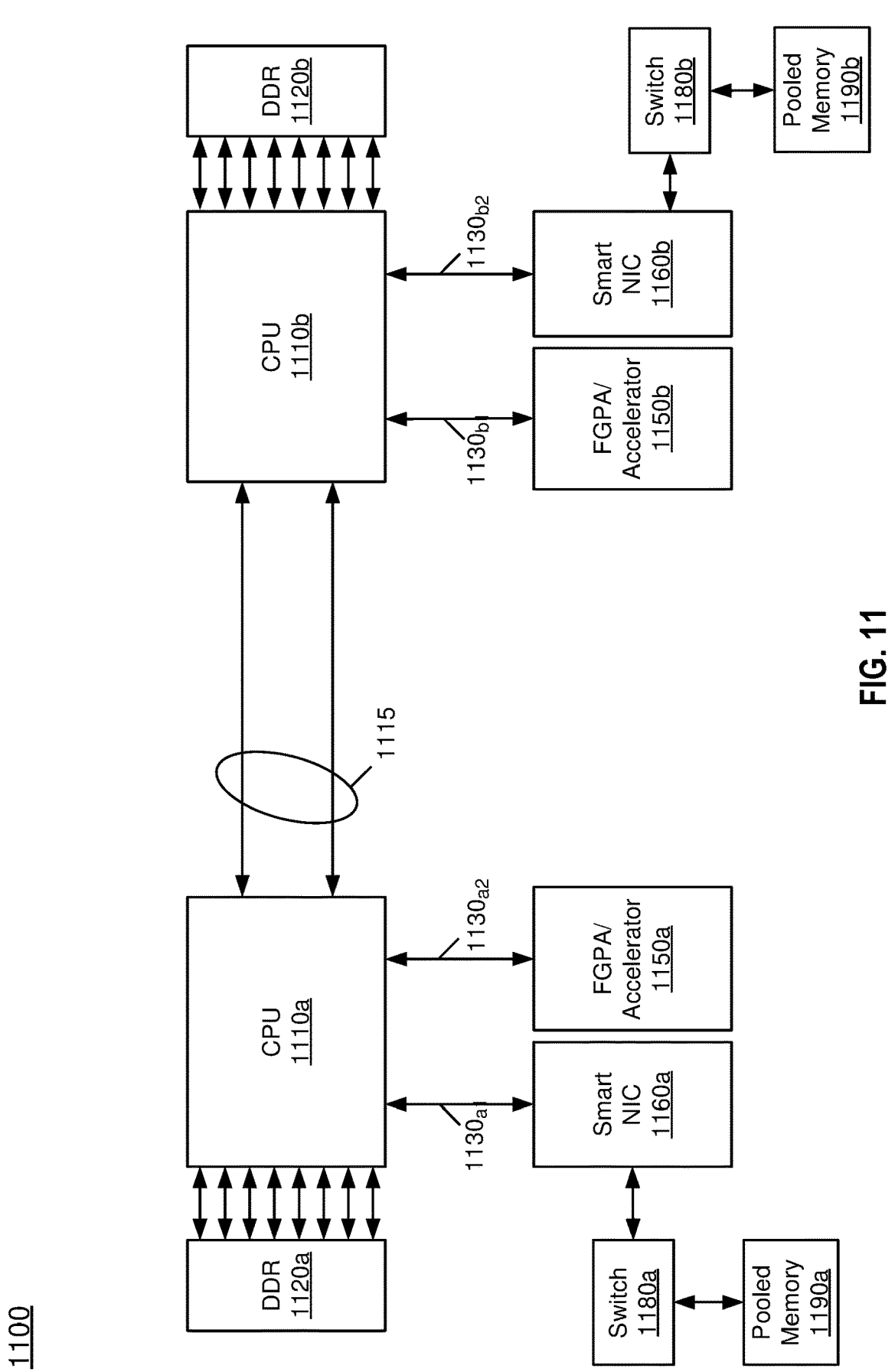
FIG. 11 is a block diagram of a system in accordance with an embodiment.

Embodiments may be used in other systems, such as in connection with optical transceivers that couple together via optical fibers, such as may be present in a datacenter environment. Referring now to FIG. 11, shown is a block diagram of a system in accordance with another embodiment. As shown in FIG. 11, a system 1100 may be any type of computing device, and in one embodiment may be a server system that is part of a datacenter. In the embodiment of FIG. 11, system 1100 includes multiple central processing units (CPUs) 1110*a,b* that in turn couple to respective system memories 1120*a,b* which in embodiments may be implemented as double data rate (DDR) memory. Note that CPUs 1110 may couple together via an interconnect system 1115, which in an embodiment can be an optical interconnect that communicates with optical circuitry (which may be included in or coupled to CPUs 1110) including optical transceivers having PICs including one or more SiPDs to enable in-line optical power monitoring as described herein.

To enable coherent accelerator devices and/or smart adapter devices to couple to CPUs 1110 by way of potentially multiple communication protocols, a plurality of interconnects 1130*a*1-*b*2 may be present. In an embodiment, each interconnect 1130 may be a given instance of a Compute Express Link (CXL) interconnect.

In the embodiment shown, respective CPUs 1110 couple to corresponding FPGAs/accelerator devices 1150*a,b* (which may include graphics processing units (GPUs), in one embodiment. In addition CPUs 1110 also couple to smart network interface circuit (NIC) devices 1160*a,b*. In turn, smart NIC devices 1160*a,b* couple to switches 1180*a,b* that in turn couple to a pooled memory 1190*a,b* such as a persistent memory. Note that any of the interconnects shown may be implemented as optical fibers that couple to optical transceivers incorporating embodiments.

Embodiments may be used in systems that use optical transceivers that couple together via optical fibers, such as may be present in a datacenter environment. Referring now to FIG. 11, shown is a block diagram of a system in accordance with an embodiment. As shown in FIG. 11, a system 1100 may be any type of computing device, and in one embodiment may be a server system that is part of a datacenter. In the embodiment of FIG. 11, system 1100 includes multiple central processing units (CPUs) 1110*a,b* that in turn couple to respective system memories 1120*a,b* which in embodiments may be implemented as double data rate (DDR) memory. Note that CPUs 1110 may couple together via an interconnect system 1115, which in an embodiment can be an optical interconnect that communicates with optical circuitry (which may be included in or coupled to CPUs 1110) including optical transceivers having PICs with TSVs to increase bandwidth, fidelity and enable more efficient packaging as described herein.

To enable coherent accelerator devices and/or smart adapter devices to couple to CPUs 1110 by way of potentially multiple communication protocols, a plurality of interconnects 1130*a*1-*b*2 may be present. In an embodiment, each interconnect 1130 may be a given instance of a Compute Express Link (CXL) interconnect.

In the embodiment shown, respective CPUs 1110 couple to corresponding FPGAs/accelerator devices 1150*a,b* (which may include graphics processing units (GPUs), in one embodiment. In addition CPUs 1110 also couple to smart network interface circuit (NIC) devices 1160*a,b*. In turn, smart NIC devices 1160*a,b* couple to switches 1180*a,b* that in turn couple to a pooled memory 1190*a,b* such as a persistent memory. Note that any of the interconnects shown may be implemented as optical fibers that couple to optical transceivers incorporating embodiments.

The following examples pertain to further embodiments.

In one example, an apparatus comprises: a PIC formed on a semiconductor die having a first side and a second side opposite the first side, wherein the first side includes a first optical circuit and a second optical circuit and the second side is to electrically couple with a substrate; and the PIC further having one or more TSVs formed through the semiconductor die to electrically couple the first side with the second side, where at least one of the TSVs is to enable electrical coupling between a first other die adapted to the first side and a second other die.

In an example, the apparatus comprises a package comprising the PIC, the first other die and the second other die.

In an example, the first other die is adapted to the first side, and the PIC and the second other die are adapted to the substrate.

In an example, the one or more TSVs comprises: a first set of TSVs to couple first RF interconnects of the substrate to at least the first optical circuit in the PIC; and a second set of TSVs to couple at least the second optical circuit in the PIC to second RF interconnects of the substrate.

In an example, the first optical circuit in the PIC comprises: a modulator having a plurality of RF input bond pads to couple to corresponding RF output bond pads of a driver; a pair of signal lines to receive and communicate RF signals from the driver; and an optical splitter to receive an optical input signal and output a pair of optical signals along a pair of optical waveguides under RF traveling wave.

In an example, the semiconductor die of the PIC further comprises an RF termination/bias circuit coupled to the modulator and comprising a first capacitor, the first capacitor to couple in parallel with an external capacitor.

In an example, the second optical circuit in the PIC further comprises: a photodetector having at least one RF output bond pad to couple to a corresponding at least one RF input bond pad of a transimpedance amplifier; and a plurality of AC ground bond pads to provide a bias voltage to the photodetector.

In an example, the first other die comprises the transimpedance amplifier, where the transimpedance amplifier is to directly couple to the photodetector via at least one flip chip bond coupled to the at least one RF output bond pad of the photodetector and the at least one RF input bond pad of the transimpedance amplifier.

In an example, the apparatus further comprises an interface circuit coupled to the PIC, the interface circuit comprising an optical input/output circuit to couple the modulator and the photodetector to an optical fiber.

In an example, the apparatus further comprises an ASIC comprising: a digital signal processor to output first digital data and receive second digital data; a digital-to-analog converter to convert the first digital data to first analog data, the digital-to-analog converter to couple to the driver; and an analog-to-digital converter to convert second analog data to the second digital data, the analog-to-digital converter to couple to the transimpedance amplifier.

In an example, the first other die comprises the driver, wherein the driver is to directly couple to the modulator via flip chip bonds coupled to the plurality of RF input bond pads of the modulator and the corresponding RF output bond pads of the driver.

In an example, the first other die is stacked above the PIC and is adapted thereto by a plurality of flip chip bonds, to enable a driver of the first other die to directly couple to a modulator of the PIC and enable a transimpedance amplifier of the first other die to directly couple to a photodetector of the PIC.

In an example, the first optical circuit comprises at least one laser and at least one semiconductor optical amplifier.

In an example, the PIC comprises: a plurality of modulators each to modulate an optical input signal with a RF input signal; and a plurality of photodetectors each to receive an optical input signal and output an RF output signal.

In an example, at least one of the first optical circuit or the second optical circuit is adapted on a top surface of the semiconductor die of the PIC to enable on-wafer test thereof.

In another example, an integrated optical transceiver comprises a package having: a substrate having RF interconnects; a DSP ASIC adapted to the substrate via first flip chip bonds; a PIC adapted to the substrate via second flip chip bonds, the PIC comprising a semiconductor die; and an electrical circuit adapted to the PIC via third flip chip bonds, the electrical circuit comprising at least one driver and at least one transimpedance amplifier; where the PIC comprises a plurality of TSVs formed through the semiconductor die to electrically couple the DSP ASIC with the electrical circuit.

In an example, the PIC comprises a plurality of channels, each of the plurality of channels comprising a modulator.

In an example, the semiconductor die comprises: a modulator circuit directly coupled to the at least one driver via a first portion of the third flip chip bonds; and a photodetector circuit directly coupled to the at least one transimpedance amplifier via a second portion of the third flip chip bonds.

In yet another example, a method comprises: communicating first electrical information from a first die coupled to a substrate to a driver circuit adapted to a PIC via at least one TSV of the PIC; driving the first electrical information to a modulator of the PIC as a first RF signal via the driver circuit; modulating, in the modulator of the PIC, the first RF signal with an optical signal to form a first modulated optical signal; and outputting the first modulated optical signal from the PIC.

In an example, the method further comprises: receiving a second optical signal in the PIC; converting the second optical signal to a second electrical signal in a photodetector of the PIC; sending the second electrical signal to a transimpedance amplifier adapted to the PIC to output second electrical information; and outputting the second electrical information from the transimpedance amplifier to the first die via at least one other TSV of the PIC.

Other examples are possible. Example 1 is a package comprising: a PIC having a first side and a second side opposite the first side, wherein the first side of the PIC includes a first circuit and a second circuit, and wherein the second side of the PIC is to electrically couple with a substrate; one or more TSV in the PIC to electrically couple the first side of the PIC with the second side of the PIC; and a third circuit electrically coupled with a surface of the first circuit at the first side of the PIC and electrically coupled with at least one of the one or more TSV.

Example 2 may include the package of example 1, or of any other example herein, wherein the first circuit is a selected one or more of a MZM or a PD, wherein the second circuit is a selected one or more of a laser or a SOA, or wherein the third circuit is a selected one or more of a driver or a TIA.

Example 3 may include the package of example 1, or of any other example herein, wherein the third circuit is directly bonded with the surface of the first circuit.

Example 4 may include the package of example 1, or of any other example herein, wherein the PIC further comprises an optical input output (I/O) component.

Example 5 may include the package of example 1, or of any other example herein, wherein the one or more TSV are to transmit RF and/or DC signals.

Example 6 may include the package of example 1, or of any other example herein, further comprising a substrate having a first side and a second side opposite the first side, wherein the first side of the substrate is electrically coupled with at least one of the one or more TSV at the second side of the PIC.

Example 7 may include a package of example 6, or of any other example herein, further comprising a die coupled with the first side of the substrate, wherein the die is electrically coupled with the PIC using a trace on the first side of the substrate.

Example 8 may include the package of example 7, or of any other example herein, wherein the trace on the first side of the substrate forms an RF interconnect.

Example 9 may include the package of example 1, or of any other example herein, wherein the high power lasers and SOAs in the second circuit and high power drivers in third circuit are thermally coupled directly to the thermal interface wherein the heat is routed away from the package to an environment.

Example 10 may include the package of example 1, or of any other example herein, wherein the third circuit is coupled with the surface of the first chip using flip chip bonding.

Example 11 may include an apparatus comprising means to perform one or more elements of a method described in or related to any embodiments, or any other method or process described herein.

Example 12 may include a method, technique, or process as described in or related to any embodiments, or portions or parts thereof.

Example 13 may include a method, technique, apparatus, or process as described in or related to any embodiments or portions or parts thereof, wherein the method, technique, apparatus, or process are scalable to dense I/O interconnect, and/or high RF channel count.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a photonic integrated circuit (PIC) on a first semiconductor die having a first side and a second side opposite the first side, wherein the first side includes a first optical circuit and a second optical circuit and the second side is to electrically couple with a substrate, wherein the first optical circuit comprises:
     a traveling wave Mach Zehnder modulator (TW MZM) comprising a 2D array of pads including a first row comprising an adjacent pair of RF input pads between two RF ground pads and including a second row of RF ground pads;
     a pair of signal lines extending away from a first side of the 2D array of pads along opposite sides of a pair of adjacent optical waveguides, and coupled to the adjacent pair of RF input pads to receive and propagate an RF traveling wave;
     an optical splitter on a second, opposite, side of the 2D array of pads to receive an optical input signal and output a pair of optical signals to the pair of adjacent optical waveguides under the RF traveling wave; and
     an RF termination and bias circuit coupled to an opposite end of the pair of signal lines and comprising a first RF ground capacitor integrated into the PIC, the first RF ground capacitor to couple in parallel with a second, larger, capacitor, external to the PIC;
   a driver on a second semiconductor die, wherein a corresponding 2D array of pads of the driver are flip chip bonded to the 2D array of pads of the TW MZM; and
   an application specific integrated circuit (ASIC) on a third semiconductor die, wherein the ASIC comprises:
     a digital signal processor to output first digital data and receive second digital data;
     a digital-to-analog converter to convert the first digital data to first analog data, the digital-to-analog converter to couple to the driver through silicon vias (TSVs) in the first semiconductor die.

2. The apparatus of claim 1, wherein the apparatus comprises a package comprising the PIC, the second semiconductor die and the third semiconductor die, wherein the PIC and the third semiconductor die are both attached to the substrate.

3. The apparatus of claim 1, wherein a second optical circuit in the PIC further comprises:
a photodetector comprising a 2D array of pads including a first row comprising a single RF input output pad between two RF ground pads and including a second row of RF ground pads to couple to a corresponding 2D array of pads of a transimpedance amplifier on the second semiconductor die.

4. The apparatus of claim 3, wherein the 2D array of pads of the transimpedance amplifier are flip chip bonded to the 2D array of pads of the photodetector.

5. The apparatus of claim 3, wherein the ASIC comprises an analog-to-digital converter to convert second analog data to the second digital data, the analog-to-digital converter to couple to the transimpedance amplifier.

6. The apparatus of claim 3, wherein the PIC comprises:
a plurality of modulators, each to modulate an optical input signal with a radio frequency (RF) input signal; and
a plurality of photodetectors each to receive an optical input signal and output an RF output signal.

7. The apparatus of claim 3, further comprising an interface circuit coupled to the PIC, the interface circuit comprising an optical input/output circuit to couple the modulator and the photodetector to an optical fiber.

8. The apparatus of claim 1, wherein the first optical circuit comprises at least one laser or at least one semiconductor optical amplifier.

9. An integrated optical transceiver comprising:
a package comprising:
a substrate having radio frequency (RF) interconnects;
a digital signal processor (DSP) application specific integrated circuit (DSP ASIC) on a first semiconductor die coupled to the substrate via first flip chip bonds;
a photonic integrated circuit (PIC) coupled to the substrate via second flip chip bonds, the PIC comprising a second semiconductor die; and
an electrical circuit comprising a third semiconductor die coupled to the PIC via third flip chip bonds, the electrical circuit comprising at least one driver and at least one transimpedance amplifier;
wherein the PIC comprises a plurality of through silicon vias (TSVs) formed through the semiconductor die to electrically couple the DSP ASIC with the electrical circuit, and comprises:
a travelling wave Mach Zehnder modulator (TW MZM) comprising a 2D array of pads including a first row comprising an adjacent pair of RF input pads between two RF ground pads and including a second row of RF ground pads;
a pair of signal lines extending away from a first side of the 2D array of pads along opposite sides of a pair of adjacent optical waveguides, and coupled to the adjacent pair of RF input pads to receive and propagate an RF traveling wave;
an optical splitter on a second, opposite, side of the 2D array of pads to receive an optical input signal and output a pair of optical signals to the pair of adjacent optical waveguides under the RF traveling wave; and
an RF termination and bias circuit coupled to an opposite end of the pair of signal lines, and comprising a first RF ground capacitor integrated into the PIC, the first RF ground capacitor to couple in parallel with a second, larger, capacitor, external to the PIC.

10. The integrated optical transceiver of claim 9, wherein the PIC comprises a plurality of channels, each of the plurality of channels comprising a modulator.

11. The integrated optical transceiver of claim 9, wherein the second semiconductor die comprises:
a photodetector circuit directly coupled to the at least one transimpedance amplifier via a second portion of the third flip chip bonds.

\* \* \* \* \*